UNITED STATES PATENT OFFICE.

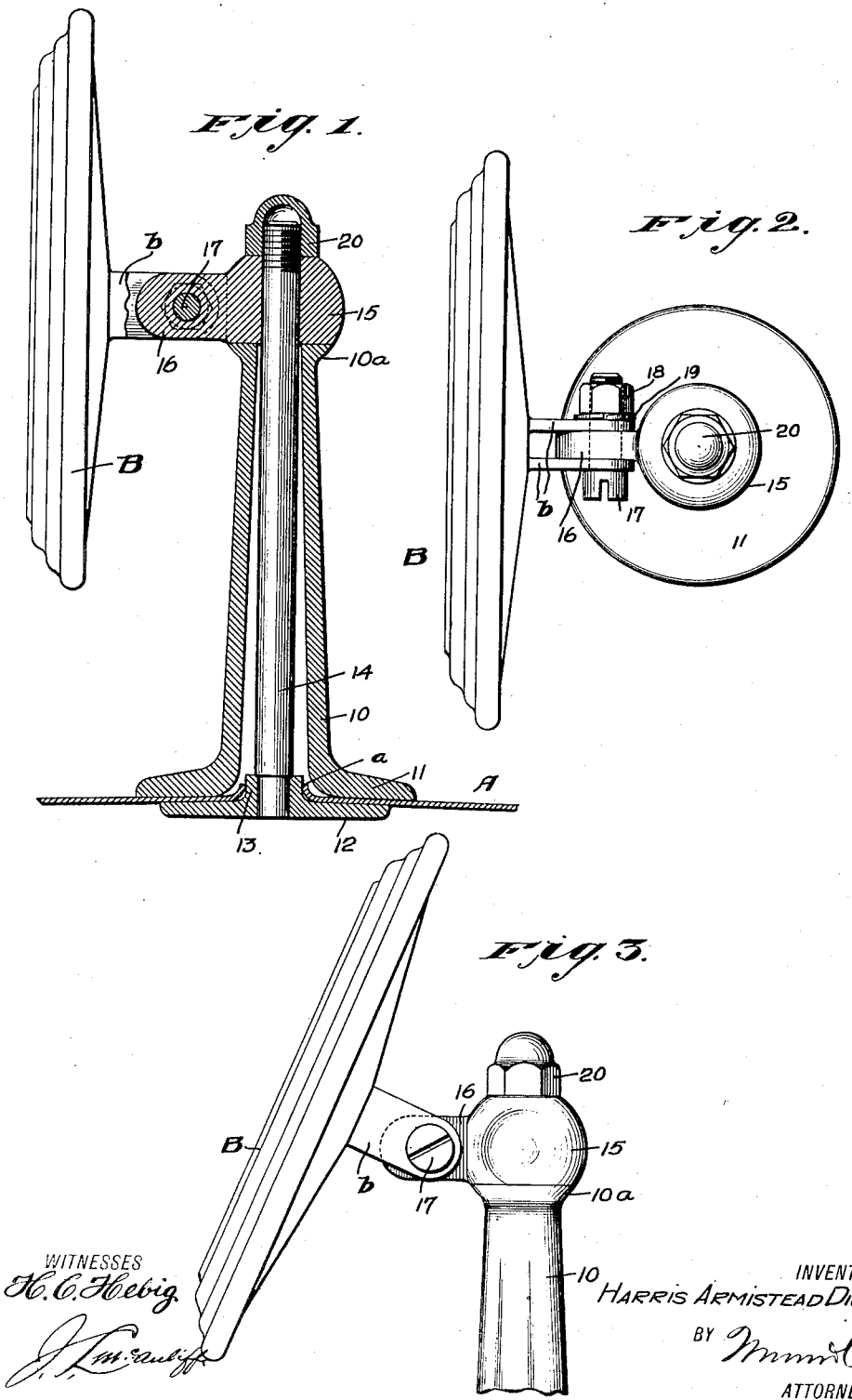

HARRIS ARMISTEAD DIUGUID, OF BROOKLYN, NEW YORK.

HOLDER FOR MIRRORS AND OTHER ARTICLES.

1,380,193. Specification of Letters Patent. Patented May 31, 1921.

Application filed December 9, 1920. Serial No. 429,449.

*To all whom it may concern:*

Be it known that I, HARRIS ARMISTEAD DIUGUID, a citizen of the United States, and a resident of the city of New York, borough of Brooklyn, in the county of Kings and State of New York, have invented a new and Improved Holder for Mirrors and other Articles, of which the following is a description.

My invention while capable of use for holding various articles has special utility as a means for holding a mirror on the fender of an automobile.

The general object of my invention is to provide a holder embodying a standard, and clamp means functioning in coaction with the standard to clamp the holder in position on a fender or like support and constituting also means to clamp in place on the standard a bracket for holding a mirror or other article.

More specifically, the invention has for an object to provide a practical embodiment of the invention, whereby to promote convenience in securing the holder in position and in adjusting the mirror and the bracket therefor as well as to provide a construction lending itself to the production of a holder having desirable esthetic attributes having in view the prominence of the holder when employed on an automobile.

Reference is to be had to the accompanying drawings forming a part of this specification, it being understood that the drawings are merely illustrative of one example of the invention.

Figure 1 is a partly sectional side elevation of a holder embodying my invention and showing a mirror positioned thereon;

Fig. 2 is a plan view of the holder and mirror;

Fig. 3 is a fragmentary side elevation showing the upper portion of the holder and the mirror.

My invention includes a tubular standard 10 presenting a broad base 11 thereon adapted to rest on a fender a fragment of which is indicated at A. The fender or other support is clamped between the under side of the base 11 and a clamp element 12 therebeneath, said clamp element 12 advantageously in the preferred form having a central boss 13 adapted to be protruded through an opening $a$ in the fender A or other support.

A post 14 rises from the clamp element 12 and extends through the tubular standard 10, the upper end of the post projecting above the standard sufficiently for said post to receive a tubular bracket body 15 presenting a laterally disposed bracket arm 16. The bracket arm 16 is adapted to have secured thereto a mirror B or similar article to be supported. In the illustrated example the mirror B is shown with spaced parallel bracket arms $b$ on the same at the back, between which arms bracket arm 16 is received. A screw bolt 17 extends through the bracket arms 16 and $b$ and receives a nut 18, there being in practice employed also, a spring washer 19 on said bolt beneath the nut to hold the latter against accidental loosening. The stud 14 extends freely through the bracket body 15 so that the latter may turn on the post in varying the angular position of the bracket arm 16, to thereby dispose the mirror B or the like facing in the desired direction. The upper end of the post 14 is threaded and receives a cap nut 20, or equivalent nut, above the bracket body 15.

With the described construction it will be seen that the holder is installed by positioning the standard 11 with its base resting on the top of the fender A or other support. The hole $a$ having been formed in the fender, the post 14 is passed upwardly through said hole from the underside of the fender and then clamp element 12 brought directly against the fender at the under side. The bracket body 15 is now placed on the post 14 and said body having been positioned to dispose its bracket arm 16 in the desired direction the cap nut 10 is tightened. It will thus be seen that the nut 20 serves at the same time to draw the post 14 and its clamp element 12 upwardly and simultaneously to exert a downward pressure on the standard 10 and base 11, thereby securely clamping the holder in position on the fender. At the same time the nut serves to hold the bracket body 15 and mirror B fixed in the adjusted position.

The upper end of the tubular standard 10 is in practice broadened as at $10^a$ to afford ample bearing surface for the bracket body 15 and said enlarged upper end $10^a$ and bracket body 15 form part of the same spherical surface or other given desirable conformation so that the joint between the bracket body and the standard is not conspicuous and the two are thus made to present jointly an ornamental head at the upper end of the holder.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:—

1. A holder of the class described comprising a supporting column in the form of a tubular standard, the base of which forms a clamp element adapted to rest on a fender or other support, a second clamp element adapted to be disposed at the under side of the fender or other support, a post rising from the second clamp element and extending through and above said tubular standard, an element supported on said standard at the top, means to secure to said element the article to be supported, said post extending through said element, and means on the post at the upper end to act on said post and said standard for causing the clamp sections to exert a clamping action on the support.

2. A holder of the class described comprising a supporting column in the form of a tubular standard, the base of which forms a clamp element adapted to rest on a fender or other support, a second clamp element adapted to be disposed at the under side of the fender or other support, a post rising from the second clamp element and extending through and above said tubular standard, an element supported on said standard at the top, said post extending through said element, means on said element adapted to receive the article to be supported, and means engaging said post at the upper end and bearing against said element to bind the latter in adjusted position and to give relative movement to the post and standard causing the clamp sections to exert a clamping action on the support.

3. A holder of the class described including a tubular standard having a broad base forming a clamp section adapted to rest on a fender or other support, a second clamp-section beneath the first clamp section and adapted to be disposed at the under side of the fender or other support, a post riding from said second clamp section and extending through and above said standard, a bracket body resting on said standard at the top and turnable on said post, said body presenting a lateral bracket arm, a nut on the post above said bracket body, and means to secure to said arm the article to be supported.

4. A holder of the class described including a tubular standard broadened at the base to constitute a clamp section adapted to rest on a fender or other support, said tubular standard having a broadened upper end, a second clamp section beneath the first clamp section and adapted to be disposed at the under side of the fender or other support, a post rising from said second clamp section extending through and above said standard, a bracket body resting on said enlarged upper end of the standard and turnable on said post, a bracket arm on said body at a side thereof, means to secure said arm to the article to be supported, and a cap nut threaded on the upper end of said post above said bracket body and adapted to bear against the latter.

5. A holder of the class described including a standard having a base constituting a clamp section adapted to rest on a fender or like support, a second clamp section beneath the first clamp section and adapted to be disposed at the under side of the support, said second clamp section presenting an upwardly extending boss, a post rising from the second clamp section central of said boss and extending through and above said standard, a bracket element turnable on said post above the standard and adapted to receive the article to be supported, and means to clamp said element against turning.

HARRIS ARMISTEAD DIUGUID.